W. G. ALEXANDER.
Gate.
No. 217,312. Patented July 8, 1879.
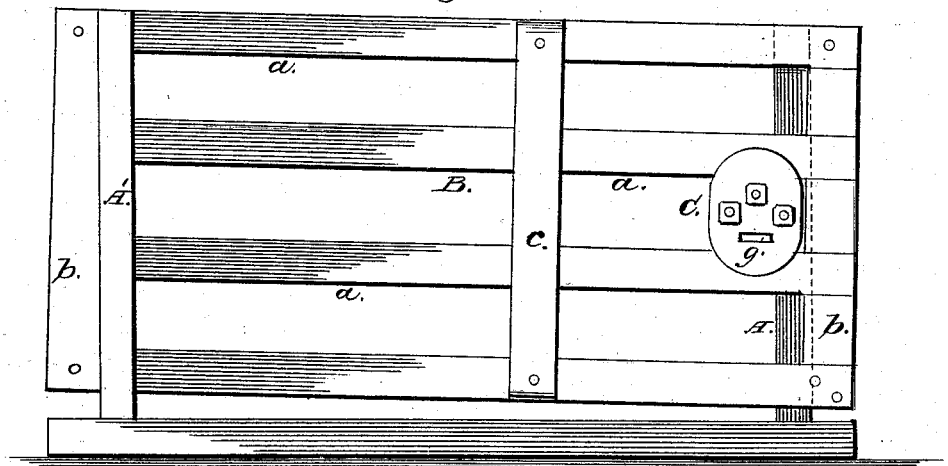
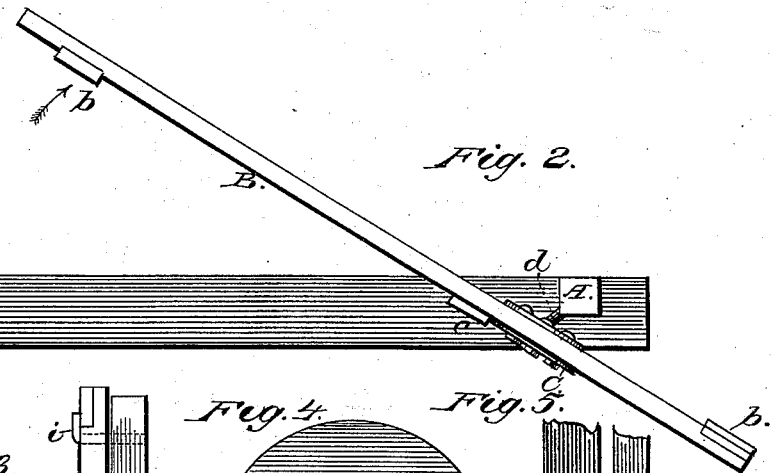
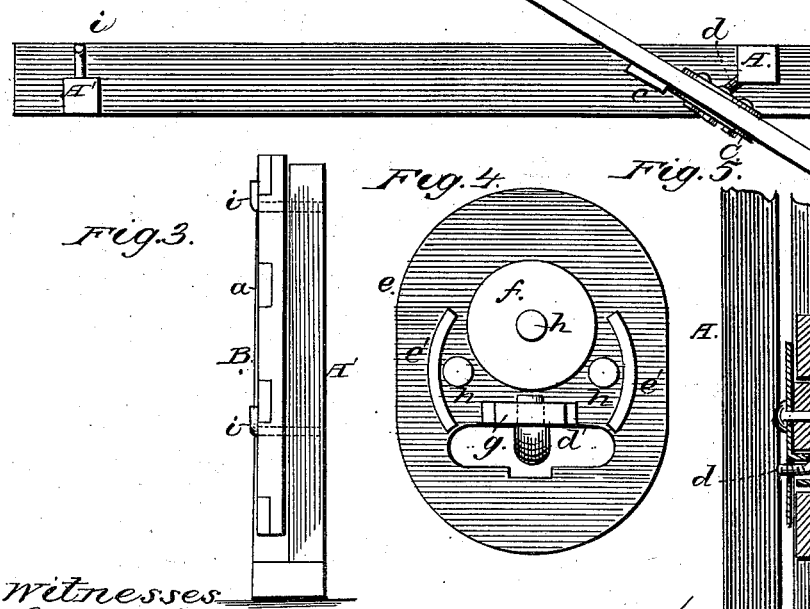

UNITED STATES PATENT OFFICE.

WILLIAM G. ALEXANDER, OF OSKALOOSA, IOWA.

IMPROVEMENT IN GATES.

Specification forming part of Letters Patent No. 217,312, dated July 8, 1879; application filed May 19, 1879.

*To all whom it may concern:*

Be it known that I, WILLIAM G. ALEXANDER, of Oskaloosa, in the county of Mahaska and State of Iowa, have invented certain new and useful Improvements in Gates; and I do hereby declare that the following is a full, clear, and exact description of the invention, which will enable others skilled in the art to which it appertains to make and use the same, reference being had to the accompanying drawings, which form a part of this specification, and in which—

Figure 1 is a front elevation. Fig. 2 is a top view, showing the gate partially open. Fig. 3 is an end view. Fig. 4 is a view, on an enlarged scale, of the roller-hinge with its covering-plate removed; and Fig. 5 is a vertical section of the same.

Similar letters of reference indicate corresponding parts in all the figures.

This invention has relation to farm and other gates; and consists in the combination, with the gate-panel, of a peculiarly-constructed roller-hinge, substantially as hereinafter more fully set forth.

In the drawings, A A' are the posts between which the gate B is hung. This consists of parallel horizontal slats $a$ $a$, united by the end pieces, $b$ $b$, and one or more cross bars or braces, $c$. Projecting obliquely from one of the corners of post A is a hooked arm, $d$, upon the hook $d'$ of which the roller-hinge C is pivoted. This hinge consists of a case, $e$, of oblong or oval shape, open at the top to allow the face or periphery of the roller $f$ to come in contact with one of the gate-slats $a$, which is inserted between the face-plates of case $e$, and rests with its lower edge upon the roller. One of the face-plates of the hinge-case $e$ is provided with a projecting bracket, $g$, which fits into a slot or opening in the plate opposite, and has a vertical perforation, through which the bent arm or hook $d'$ of the hinge-arm $d$ is inserted from below; and the opposite plate has a corresponding projection or bracket, $g'$, which reaches in under arm $d$, and prevents the hinge-case from being lifted off of this arm. One of the case-plates $e$ is provided with side flanges, $e'$ $e'$, impinging upon the plate opposite, to prevent dirt or dust from entering the case and interfere with the working of the pivot $d'$ and roller $f$, and the two plates $e$ $e$ are secured together by bolts $h$ to form the complete case; or, if preferred, the hinge-case, consisting of the front and back plates, $e$ $e$, side plates, $e'$ $e'$, and brackets $g$ $g'$, may be cast in one piece.

By reference to Fig. 1 of the drawings, the manner of supporting the gate-panel upon the roller-hinge will be readily understood. The gate is inserted obliquely between the posts A A', with one of its slats $a$ riding upon the roller $f$ between plates $e$ $e$, which serve as guides in sliding the gate, the forward end of which is hung in staples $i$ $i$ in post A' when closed. The gate swings, in opening it, in the direction of the arrow, Fig. 2, and may be opened either by swinging it with its hinge upon the pivot $d$ $d'$ only, or by swinging it only sufficient to release it from the staples $i$ $i$, and then sliding it back upon the roller, or by a combination of these two motions, as convenience or expediency directs.

Having thus described my invention, I claim and desire to secure by Letters Patent of the United States—

The gate-hinge C, consisting of the case $e$, provided with brackets $g$ $g'$, roller $f$, and pivot $d$ $d'$, combined and operating as set forth.

In testimony that I claim the foregoing as my own I have hereto affixed my signature in presence of two witnesses.

WM. G. ALEXANDER.

Witnesses:
   O. C. G. PHILLIPS,
   F. S. ROBINSON.